US006300627B1

(12) United States Patent
Köster et al.

(10) Patent No.: US 6,300,627 B1
(45) Date of Patent: Oct. 9, 2001

(54) DAUGHTER ION SPECTRA WITH TIME-OF-FLIGHT MASS SPECTROMETERS

(75) Inventors: Claus Köster, Lilienthal; Armin Holle, Oyten; Jochen Franzen, Bremen, all of (DE)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 09/452,641

(22) Filed: Dec. 1, 1999

(30) Foreign Application Priority Data

Dec. 4, 1998 (DE) ........................................ 198 56 014

(51) Int. Cl.[7] ........................ B01D 59/44; H01J 49/00

(52) U.S. Cl. ........................................ 250/287

(58) Field of Search .............................. 250/287, 292, 250/396

(56) References Cited

U.S. PATENT DOCUMENTS 5,464,985 11/1995 Cornish et al. .
5,654,545 * 8/1997 Hollee et al. .................... 250/287
5,734,161 * 3/1998 Koster .............................. 250/287
5,821,534 * 10/1998 Park ................................ 250/287
5,859,433 * 1/1999 Frazen .............................. 250/292
5,861,623 * 1/1999 Park ................................ 250/287
5,942,758 * 8/1999 Park ................................ 250/396
5,986,258 * 11/1999 Park ................................ 250/287

FOREIGN PATENT DOCUMENTS 2 295 720 6/1996 (GB) .

OTHER PUBLICATIONS

W.C. Wiley et al.; Time–of–Flight Mass Spectrometer with Improved Resolution; The Review of Scientific Instruments; vol. 26, No. 12, Dec., 1955; pp. 1150–1157.

* cited by examiner

*Primary Examiner*—Jack Berman
*Assistant Examiner*—Johnnie L Smith, II

(57) ABSTRACT

The invention relates to time-of-flight mass spectrometers for the measurement of daughter ion spectra (also called fragment ion spectra or MS/MS spectra) and corresponding measurement methods.

Figure 1:
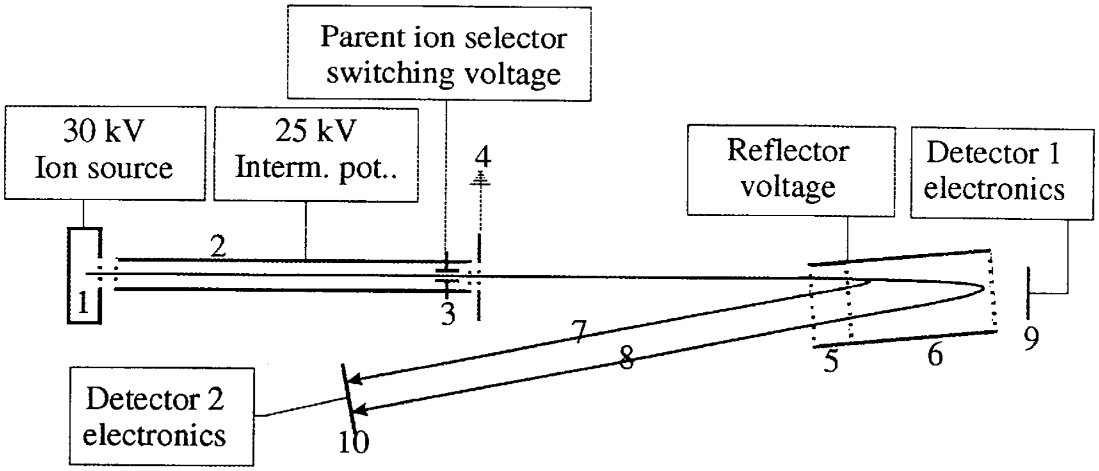

According to the invention, the ions of an ion source are initially accelerated only to an intermediate level of energy, allowing them to decompose at that energy level by metastable decomposition or by collisionally induced fragmentation (CID). The ions are then accelerated in a second step to a high energy level. Light fragment ions gain a higher velocity than heavier fragment ions or non-decomposed parent ions. The spectrum of fragment ions can be detected separated by mass in either linear or reflector mode. An ion selector at the low energy level selects a single type of parent ion in order to avoid superpositions with fragment ions of other parent ions. A particularly preferred embodiment raises the potential of ions, for there second acceleration, during their flight through a small electrically isolated flight path chamber.

17 Claims, 1 Drawing Sheet

DAUGHTER ION SPECTRA WITH TIME-OF-FLIGHT MASS SPECTROMETERS

The invention relates to time-of-flight mass spectrometers for the measurement of daughter ion spectra (also called fragment ion spectra or MS/MS spectra) and corresponding measurement methods.

According to the invention, the ions of an ion source are initially accelerated only to an intermediate level of energy, allowing them to decompose at that energy level by metastable decomposition or by collisionally induced fragmentation (CID). The ions are then accelerated in a second step to a high energy level. Light fragment ions gain a higher velocity than heavier fragment ions or non-decomposed parent ions. The spectrum of fragment ions can be detected separated by mass in either linear or reflector mode. An ion selector at the low energy level selects a single type of parent ion in order to avoid superpositions with fragment ions of other parent ions. A particularly preferred embodiment raises the potential of ions, for there second acceleration, during their flight through a small electrically isolated flight path chamber.

PRIOR ART

The conventional method of time-of-flight mass spectrometry generates the ions in pulses, e.g. by shots of laser light, within the ion source at a constant high voltage of 6 to 30 kilovolts. The ions being expelled from the ion source are accelerated in the acceleration region between the ion source and the base electrode, then pass through an aperture in the base electrode into a field-free flight region, and finally hit an time-resolving ion detector where they are measured. The measured arrival time of the ions at the detector can be used to determine their mass m (or rather their mass-to-charge ratio m/e) from their identical kinetic energy. For the purpose of simplification, reference is here always made to the mass m, even though mass spectrometry is only involved in measuring the mass-to-charge ration m/e, whereby z is the number of elementary charges of the ion. Since many types of ionization, for example MALDI, mainly provide ions with a single charge only (z=1), there is literally no difference.

As the ions originating from the ion source frequently possess an initial energy which is not the same for all the ions, higher acceleration methods of 20 to 30 kilovolts have become common, because then the spread of the initial energy of the ions has a less detrimental effect on mass resolution. For even better levels of mass resolution the velocity-focusing method with a two-stage Mamyrin ion reflector has proven successful whereby the ions are reflected into a second linear, field-free flight region. In the first stage of the reflector, the ions are considerably decelerated, while in the second stage they are only decelerated slightly. Faster ions penetrate farther into the weak deceleration field of the second stage than slower ions so they cover a longer distance, which, if the two deceleration fields are set correctly, can accurately compensate for the faster velocity of flight and therefore increase the mass resolving power.

One of the most frequently used ion sources in time-of-flight mass spectrometry utilizes matrix-assisted laser desorption for ionization (MALDI). The samples are located in a matrix substance on a sample support plate. The ions generated by a laser light pulse lasting 1 to 20 nanoseconds leave the surface with a higher spread of velocities.

Since this rather wide spread of velocities can no longer be properly focused by a reflector, another method for improving the mass resolution, a delayed acceleration of the ions with respect to the laser pulse, has proven successful for MALDI. The basic principle for this increase in mass resolution under conditions of initial energy spread of the ions has already been known for over 40 years now. The method was published in the paper by W. C. Wiley and I. H. McLaren, "Time-of-Flight Mass Spectrometer with Improved Resolution", Rev. Scient. Instr. 26, 1150, 1955. The method was termed "time lag focusing" by the authors. Most recently it has been investigated under various names ("space-velocity correlation focusing" or "delayed extraction" for instance) in scientific papers with regard to MALDI ionization; it is also available in commercial time-of-flight mass spectrometers.

The reflector of a time-of-flight mass spectrometer can, however, also be used to investigate fragment ions which are generated in the field-free ion path from selected ions. The selected type of ions is frequently called "parent ions" or "precursor ions". The decomposition may be caused by internal energy of the ions gained in the ionization process itself or by collisions in a gas filled collision cell.

If parent ions decompose into fragment ions in the field-free region after acceleration, all the fragment ions continue to fly at the same velocity v as their parent ions but they carry considerably less kinetic energy $E_k = mv^2/2$ due to their smaller mass. They penetrate to a much lesser extent into the second deceleration field of the reflector, return much earlier, and are measured mass-separated at the end of the second field-free flight region.

In the MALDI process of ionization, the ions in the vapor cloud generated by the laser pulse are subjected to very many collisions, which increase the inner energy of the ions by multiple but mild excitation of intra-molecular oscillations. Consequently a number of these ions become "metastable", which means these ions decompose with a half life in the order of several microseconds so a detection of decomposition ions in the mass spectrometer becomes possible. Detection of fragment ions which occur in the first field-free flight region of the mass spectrometer by the reflector of a time-of-flight spectrometer has become known as the PSD method (PSD =post source decay). On the other hand, the parent ions in flight can also pass through a collision-gas filled cell in the drift region and thus form collision-induced fragment ions which can be detected in the same manner (CID=collisionally induced decomposition).

The method of measuring PSD or CID fragment ions by means of the reflector has serious disadvantages. Detection of ions is restricted to a relatively small energy range, about 25% 30% in usual versions of commercially available equipment. Ions always have to pass through the strong deceleration field of the first reflector stage to be reflected with velocity focusing. However, this first deceleration field already consumes a good ⅔ of the original acceleration energy, thus light ions do not pass this region. The full mass spectrum has to be measured step-wise. From parent ions with a mass of 3,200 atomic mass units, only fragment ions of about 2,400 to 3,200 atomic mass units can be scanned in a first step of spectrum acquisition, fragment ions between 1,800 and 2,400 mass units can be scanned in a second spectrum acquisition, fragment ions between 1,350 and 1,800 mass units can be scanned in a third spectrum acquisition, and so forth. For a medium-sized peptide about 10–15 scans are necessary if the entire spectrum of fragment ions is to be measured. All these spectra must be adjusted to one another by a complex mass calibration method. Only then can these partial sections of the spectrum be collated in the data system to make up an artificially generated composite spectrum.

The number of individual spectra can in principle be reduced if the reflector is lengthened considerably. Then the first deceleration field can be reduced. However, then the ion spends the largest part of its life between generation in the ion source and its measurement in the ion detector in precisely this reflector. This causes most of the decompositions to take place not in the first field-free flight region but in the reflector. These ions are then distributed as background ions over the entire spectrum and thus cause substantial background noise which leads to a bad signal-to-noise ratio and impairs detection of the decomposed ions.

A better method was proposed in U.S. Pat. No. 5 464 985 (T. J. Cornish and R. J. Cotter). Here the reflector did not have a uniform deceleration field but a non-linearly rising deceleration potential ("curved potential"). A linearly rising deceleration field, for example, produces a quadratically rising potential. In this way a very large mass range of the fragment ions can be recorded in a single scan. Unfortunately focussing conditions are only optimal when the field-free flight region in front of the reflector is relatively short compared to the length of the reflector so here too there is a problem with quite substantial background noise.

When in this context reference is made to the acquisition (or scanning) of a time-of-flight spectrum, this generally means the recording and addition of numerous individual spectra scanned under the same conditions. This addition takes place in order to increase the dynamic range of scanning and to produce better signal-to-noise conditions.

OBJECTIVE OF THE INVENTION

It is the objective of the invention to define a time-of-flight mass spectrometer and methods for the scanning of fragment ions generated on a metastable or collision-induced basis in a single scan over a large mass range with low background noise.

BRIEF DESCRIPTION OF THE INVENTION

It is the general idea of the invention to accelerate parent ions from an ion source in a first acceleration region with moderate acceleration potential only, cause them to decompose by metastable or collision-induced decay in a first field-free flight subregion, then to subject them to post acceleration in a second acceleration region which brings the fragment ions of various masses to mass-specific velocities, and to detect them mass-separately after a second field-free flight subregion (or, if using a reflector, after a third subregion).

In this process the time-of-flight mass spectrometer can be used in the linear operating mode without reflecting the ions but also in the reflecting mode. In the reflecting mode, the full mass range can be detected in a single scan, if the first acceleration accounts for only a small portion of the total acceleration potential (about 25% for instance) so that the levels of energy of all post-accelerated fragment ions of the various masses are relatively high and therefore can all be reflected by the reflector with good focusing (between 75% and 100% of the energy of the parent ions in our example).

If the ion source does not only generate the parent ions to be investigated but also other ions, it is necessary to use a parent ion selector ("precursor ion selector") which has already become standard. The latter consists of a fast-switching deflection capacitor which deflects all the ions, apart from the desired parent ions, from the trajectory so that the ions no longer arrive at the detector. The precursor ion selector can be situated anywhere in the trajectory between the first and second ion acceleration. The optimal position is just in front of the second acceleration region because this is where the ions are farthest mass-dispersed.

The particular advantages of this method are as follows:

- The calibration curve for the masses only needs to be recorded for a single spectrum and not for the previous large number of fragment spectra There is no need to assemble a composite spectrum.
- The light fragment ions receive more energy so they are much easier to detect in the ion detector. The secondary ion multipliers generally used here can only detect ions with a relatively high level of energy.
- The most important advantage, however, is the time saved and the sparing use of the sample available because for the complete fragment ion spectrum only a single scan is required.

The ions can, for example, be generated at a high potential and be accelerated to a slightly lower potential in a first acceleration region. They then fly, field-free, through a relatively long tube at this slightly lower potential, where they can decompose. At the end of the tube they are farther accelerated to ground potential. However, this arrangement has the disadvantage that a long piece of tube has to be kept at a relatively high potential. Usually with commercial mass spectrometers there is a high vacuum valve placed between the ion source and the flight region, which makes it easier to clean the ion source without ventilating the entire unit; in such mass spectrometers this design cannot be integrated at the beginning, nor can it be retrofitted.

For this reason it is another particular idea of the invention to arrange the potentials for the two acceleration processes not simply stationary one behind the other with two field-free flight subregions at differing potential but to provide a "lift" for the fragment and precursor ions of the required type, which takes them on the fly from the potential of the first field-free flight subsection (preferably ground potential) to the acceleration potential for the second acceleration. The second field-free flight subregion should preferably be at ground potential. This potential lift is an electrically conductive open container in the path of the ions. The lift, for instance, is designed as a small electrically conducting piece of tube, the potential of which is raised by very fast switching of a voltage through a high potential difference in the moment the still unseparated fragment and precursor ions pass this tube.

Acceleration of the ions may take place at the entrance of this container, provided the container is at lower potential when the ions enter and is then raised to the potential of the second flight subsection. However, the container may also be at the potential of the first flight subregion during entrance of the ions, whereby the acceleration takes place at the exit after potential increase. The ions in flight inside the "lift" are not subjected to a change in energy in the region of tube because they are not in any field; however, when they enter or leave through a field prevailing accordingly at that time they can be accelerated.

The lift region of tube should preferably be closed off with grids at the entrance and exit in order to create an undisturbed field-free potential inside. The piece of tube and the grid closure are then best included in two further grids at ground potential so that no potential interference is caused to the environment. One or both of the double grids at the entrance or exit then make up the second acceleration region.

This embodiment with a "lift" has the following further particular advantages:

- the arrangement can be integrated into an existent mass spectrometer, even if the mass spectrometer has a high vacuum valve between the ion source and the flight tube and is therefore established for a flight region which is "potential-free" (at chassis or ground potential), the ion source can be operated at a very much lower potential for this mode, such a "lift" can be used by appropriately controlled switching simultaneously as a precursor ion selector, and due to a temporally slightly rising lift potential during the second acceleration phase of the ions a post-focussing process can be generated which makes it possible to dispense with the delayed acceleration ("delayed extraction") in the first acceleration region or at least shortening the delay. The delayed acceleration in the ion source reduces the number of metastable ions for the PSD mode because the ions are only accelerated when the vapor cloud has largely dispersed and therefore there are not so many energy-transmitting collisions in the cloud taking place during acceleration.

BRIEF DESCRIPTION OF THE ILLUSTRATION

FIG. 1 shows a schematic representation of a reflector time-of-flight mass spectrometer based on this invention with a tube (2) which is at an intermediate potential. The ions which emerge from the ion source (1) are accelerated toward the tube (2) by only 5 kV (the difference between the ion source potential of 30 kV and the intermediate potential of 25 kV). The ions drift through tube (2), where they decompose and become metastable. At the end of the tube there is a precursor ion selector (3), which remains without any deflection voltage only in the time when the ions being measured pass, so that only those ions can pass in such a way that they can hit one of the detectors (9 or 10). If there is no voltage switched on at the reflector (5, 6), the ions subsequently accelerated at the exit of the tube (2) toward the mass electrode (4) can reach the first detector (9) (Detector 1) for the linear operating mode and be registered there with satisfying mass resolution. If, on the other hand, the negative field voltage at the reflector (5, 6) is switched on, the ions in the reflector, as evident in the figure, are reflected and reach the second detector (10) (Detector 2), whereby the beam for the light ions (7) is slightly different from the beam for the heavy ions (8).

Figure 2:
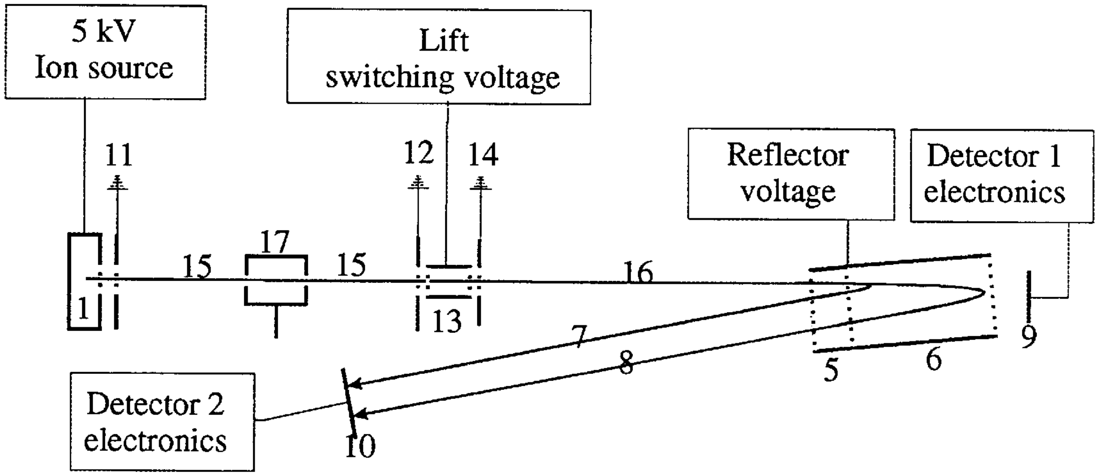

FIG. 2 shows an embodiment of the time-of-flight mass spectrometer with a lift (13) for the potential of the ions in flight. The ion source (1) is now at a low potential of only 5 kilovolts. The emerging ions are accelerated by these 5 kilovolts toward the grounded counter electrode (11). The parent ions to be investigated then fly through the first field-free flight subregion (15) at ground potential where they partially decompose due to metastability acquired in the ion source, and emerge, in an operation mode observed here, through the grid diaphragm (12) at ground potential into the lift (13) which is also at ground potential at that moment. While these ions are passing through the lift, the potential of the lift is raised to about 25 kilovolts so the ions at the exit see a potential difference of 25 kilovolts relative to the grounded electrode (14) and are post-accelerated there. The second field-free flight subregion (16) is also at ground potential. The post-accelerated ions are reflected in the reflector and, as shown in FIG. 1, pass on to the second detector (10). The lift can be used as a precursor ion selector if its potential is only switched to ground potential upon arrival of the ions to be investigated. Here too a linear mode is possible if the potential of the reflector (5, 6) is connected to ground. The ions are then detected in the first detector (9).

Optionally the first field-free flight subregion (15) can be provided with a collision cell (17) incorporating a gas feeder in order to generate collisionally induced fragment ions.

Particularly Preferred Embodiments

A simple but already effective embodiment of a method and instrument based on this invention is shown in FIG. 1 as a schematic diagram. The ions are generated in the ion source (1), for instance by a MALDI process with the aid of a laser pulse from a sample, which is applied to a sample support, which in turn is at high potential. However, other types of ion source are also suitable provided they generate or expel the ions in a brief pulse. The ions are moderately accelerated between the ion source and the tube (2) which is at intermediate potential. In a long tube (2) a large part of the ions which have become metastable in the MALDI process, decompose due to the relatively slow velocity of flight. Just before the end of the tube there is a precursor ion selector (3) which deflects all ions which do not belong to the ion type being investigated so that they no longer can reach any of the ion detectors. This precursor ion selector (3) is controlled by a fast-switching voltage supply and the selection of ions is performed by voltage pulses which only allow ions of the correct time of flight to pass straight ahead. Since the precursor ions and the fragment ions of different masses all have the same velocity, they all pass through the precursor ion selector at the same time (the term "precursor ion selector" is therefore not quite accurate; it is rather a selector for the parent ions and for all the ions which originate from the same parent ion type due to fragmentation).

Between the end of the tube (2) at intermediate potential and the electrode (4) at ground potential the ions are then accelerated for the second time. This post-acceleration ends at mass-specific velocities; light ions are faster than heavy ones. The second flight subregion is at ground potential. The ions can now either be measured with mass separation in the linear mode (with the reflector switched off or not mounted) in the first detector (9) or, after reflection in the reflector, they can be scanned as a mass spectrum after a further field-free flight subregion in the second detector (10).

At the entrance (5) the reflector has a strong opposing field or deceleration field which is continued in the interior (6) by a weaker deceleration or reflection field. Only with this arrangement is it possible to achieve a good quality of velocity focussing. However, not all ion energies can be reflected with velocity focussing; the ions require a very high minimum energy to penetrate the first deceleration field. This minimum energy is made available by this invention of a second acceleration region.

If the potential difference of the first acceleration (for instance the 5 kilovolts indicated in the illustration) is only a small fraction of the total potential difference (30 Kilovolts for instance) for acceleration, the reflector can reflect the post-accelerated ions of all masses simultaneously with velocity focussing, although the light ions have a much smaller depth of penetration in the second deceleration stage (6) than the heavy ones. If we assume that the parent ions have a mass of 2000 atomic mass units and the lightest ions have a mass of only 80 mass units, the light ions only have a kinetic energy of 200 electronvolts due to the decay, by contrast with the 5 kilo electronvolts of the parent ions. Due to the post-acceleration all the ions receive an additional kinetic energy of 25 kiloelectronvolts so the levels of energy range from 25.2 kiloelectronvolts for the light ions to 30 kiloelectronvolts for the heavy ions. If in the first deceleration stage about ⅔ of the energy of the parent ions is decelerated, that is, about 20 kiloelectronvolts, all the ions, that is, also the light ions of only 80 atomic mass units, can penetrate the second deceleration stage and are therefore reflected with velocity focusing.

With a grid-free reflector which also has a space-focussing component at the entrance, the light ions and the heavy ions can be preferably simultaneously directed toward a small-surface second detector, differently from the arrangement being shown in FIG. 1 with a reflector fitted with a grid.

Since the light ions are provided with much higher energy, they are easier to detect in the ion detector than in operation so far. Ions with an energy of only 200 electron volts are not at all detected by a multiplier. Only the fact that in front of the detector a slight post-acceleration by 1 to 3 kilovolts takes place makes these ions visible at all in operation so far.

The favorized embodiment is, however, shown in FIG. 2. Here the two first field-free flight subregions (15) and (16) are both at ground potential. The ion source is operated at a much lower potential than in FIG. 1 (only at 5 kilovolts). The fragment ions to be investigated and generated in the first field-free flight subregion (15) due to decomposition of the metastable parent ions arrive at the electrode (12), which is constantly at ground potential as is electrode (14), together with the remaining parent ions after a predetermined time of flight. At exactly that time the potential of the lift (13) is also switched to ground potential so the fragment ions can enter. Previously this potential was at a high level and all the ions arriving previously were reflected. While the fragment and parent ions under investigation are in the lift (13), the potential of the latter is raised to a high potential of 25 kilovolts, for example. When emerging from the lift, the ions now see a high acceleration field between lift (13) and diaphragm (14), post-accelerating them in accordance with the invention. The high potential of the lift simultaneously prevents further ions from entering, so the lift also acts as a precursor ion selector, at least to cut off heavier ions.

If a so-called "push-pull"-generator is used for the switchable voltage, the potential of the lift can be switched from high voltage to ground and then, after a predetermined time, back again to high voltage. With such a push-pull-generator full precursor-ion selection can be easily achieved. The function as a precursor-ion selector can even be improved if the field at the entrance of the lift is not homogenous between to parallel grids but somewhat distorted to reflect ions sideways as long as there is still a field present by a potential difference.

The time the ions spend in the lift during their flight is sufficient to switch the potential Ions with a mass of 3000 atomic mass units have a velocity of approx. 4 millimeters per microsecond at a kinetic energy of 5 kilovolts. If the lift is approx. 20 millimeters long, the switching must take place with a rise time of approx. one microsecond. Nowadays this is technically possible, although it calls for special measures, but these are known to the electronics specialist.

It is also possible to accelerate the ions at the entrance of the lift, whereby the lift at that time is at a lower level than ground potential. However, then the velocity of the ions in the lift is already larger and switching must be faster. Moreover, the velocity inside the lift is then dependent on mass and ions with a small already have a very high velocity, which again makes switching more difficult.

With this arrangement it is not only possible to select parent ions and their charged fragments, an improvement in focussing can also be achieved. For discussion we assume that acceleration takes place at the outlet of the lift. Ions with a slightly lower initial energy arrive at the acceleration region slightly later than ones with a higher initial energy. If the potential of the lift now is slowly rising, slower ions can be provided with a slightly higher post-acceleration to compensate for their lesser kinetic energy so that they arrive at the detector at the same time as the initially faster ions.

This post-focusing is of particular interest for ions generated by MALDI. Here the ions are given an initial velocity of approx. 0.5 to 1 millimeter per second due to the rapid adiabatic expansion of the vapor cloud generated by the laser flash in the vacuum with a considerable spread of initial velocity. The relative difference in velocity is strongly reduced by the first acceleration but still makes a considerable contribution to mass uncertainty. Due to the delayed acceleration the spread of initial velocities can be reduced but at the same time the production of metastable ions is also reduced. The possibility of time-varying post-focussing in the lift (or also at the end of tube (2)) now offers the option of balancing out between focussing and production of metastable ions.

The design incorporating a lift makes it possible to also retrofit this system to existing time-off-light mass spectrometers. It is also possible to build time-of-flight mass spectrometers which are provided with a vacuum valve in the first field-free flight subregion (15) to be able to aerate the ion source (1) separately from the spectrometer for cleaning purposes.

The lift system can also be designed to fold out. Then the lift, which still holds four grids, can be removed from the ion beam for the purposes of high sensitivity measurement of the original mixed spectra.

It is not necessary to only generate metastable ions. Optionally, a collision cell (17) with a supply of collision gas, which generates collisionally induced fragment ions, can be fitted somewhere in the first field-free flight region (15). Such an arrangement is independent of the generation of metastable ions in the ion source. The design with a lift (instead of a tube at high potential) is advantageous for the operation of a collision cell (17) because then the collision cell can be at ground potential. However, the lift itself can also be used as the collision cell. If the collision cell is close to the ion source, the metastable ions resulting in it can be detected. A collision cell close to the lift, on the other hand, is only beneficial to the detection of the ions decomposing spontaneously in the collision cell. Between the ions decomposing spontaneously and metastably there are considerable differences which can be utilized for the identification of the ions. For instance, peptides, which contain either leucin or isoleucin, which have identical weight, can be differentiated from one another by a different decomposition pattern of the spontaneous ions. For this reason it is useful and possible to also have mass spectrometers with two collision cells.

Naturally, a collision cell is also possible with the design using a tube (2). For instance, the entire tube (2) can be filled with collision gas and can act as a collision cell.

Of course completely different embodiments of time-of-flight mass spectrometers can also be equipped with a second acceleration region based on the invention, particularly one with a lift, for instance a time-of-flight spectrometer with more than one reflector. Any specialist involved in mass spectrometry will be able to perform such integration and equipping work with knowledge edge of this invention.

What is claimed is:

1. Time-of-flight mass spectrometer for recording spectra of daughter ions generated by metastable or collisionally induced decay from parent ions in a field-free flight region, comprising (a) an ion source for the pulsed ejection of ions, (b) a first ion acceleration stage immediately connected to the ion source, (c) a first field-free flight region, in which the decay of ions takes place, (d) a second ion acceleration stage between the first and the second field-free region, in which ions are accelerated to a significantly higher kinetic energy, (e) a second field-free flight region, and (f) at least one ion detector.

2. A mass spectrometer according to claim 1, wherein an ion velocity-focusing reflector and a third field-free flight region are located between the second field-free flight region (e) and one of the ion detectors (f).

3. A mass spectrometer according to claim 1, wherein the first field-free subregion (c) is located within an electrically conducting tube held on an electric potential between the ion source potential and the potential of the second field-free subregion.

4. A mass spectrometer according to claim 1, wherein the first (c) and second (e) field-free flight region are each at the same potential and wherein the second ion acceleration stage (d) consists of an electrically conductive, open container, the potential of which can be quickly changed by a switchable voltage generator when ions fly inside the container so that these ions are post-accelerated.

5. A mass spectrometer according to claim 4, wherein the electrically conductive container holds two grids each at the ion entrance and ion exit, one each on flight path potential and one on container potential.

6. A mass spectrometer according to claim 5, wherein the electrically conductive container together with any grids at the inlet and outlet of the ions can be moved out of the ion flight path.

7. A mass spectrometer according to claim 4, wherein the container serves as a precursor ion selector.

8. A mass spectrometer according to claim 4, wherein a separate precursor ion selector is located in the first field-free flight region.

9. A mass spectrometer according to claim 4, wherein the container serves as a collision cell for collisionally induced fragmentation by adding collision gas.

10. A mass spectrometer according to claim 1, wherein a collision cell is mounted within the first field-free region.

11. A mass spectrometer according to claim 2, wherein the velocity-focusing reflector has no grids.

12. Method for recording spectra of daughter ions generated by metastable or collisionally induced decay from parent ions during their flight in a field-free flight region, by a time-of-flight mass spectrometer, comprising the following steps:

(a) generating a pulse of ions in an ion source, (b) accelerating the ions as they leave the ion source, (c) flying the ions in a first field-free flight region, and thereby partially decaying the ions, (d) accelerating the decomposed fragment ions and non-decomposed parent ions a second time to a significantly higher kinetic energy, (e) flying the ions in at least one further field-free flight region, whereby the ions separate by mass because of their different velocities, and (f) measuring the fragment ions and parent ions mass-separated with a time-resolving resolving ion detector.

13. The method according to claim 12, wherein the fragment and parent ions enter an electrically conductive container between the first and second flight region, the potential of which is changed when the ions are flying inside the container so that the ions are post-accelerated between the first and second field-free flight region.

14. The method according to claim 13, wherein the post-acceleration takes place at the entry end of the container, at the exit end or at both ends.

15. The method according to claim 13, wherein the potential of the container is slightly changed during acceleration of the ions at the entrance or exit in order to achieve a better mass resolution of the ions at the location of the detector due to increased acceleration of slightly slower ions.

16. The method according to claim 12, wherein the ions are generated by matrix-assisted laser desorption (MALDI).

17. The method according to claim 16, wherein the metastable ions generated in the MALDI process are detected as fragment ions.

* * * * *